US010355435B2

(12) United States Patent
Walker

(10) Patent No.: US 10,355,435 B2
(45) Date of Patent: Jul. 16, 2019

(54) UNIVERSAL MULTI-CHARGER DEVICE

(71) Applicant: Leroy Walker, Lafayette, LA (US)

(72) Inventor: Leroy Walker, Lafayette, LA (US)

(73) Assignee: Leroy Walker, Lafayette, LA (US)

( * ) Notice: Subject to any disclaimer, the term of this patent is extended or adjusted under 35 U.S.C. 154(b) by 0 days.

(21) Appl. No.: 15/732,358

(22) Filed: Oct. 30, 2017

(65) Prior Publication Data

US 2018/0269640 A1 Sep. 20, 2018

Related U.S. Application Data

(60) Provisional application No. 62/496,790, filed on Oct. 31, 2016.

(51) Int. Cl.
*H02J 7/00* (2006.01)
*H01R 31/06* (2006.01)
*H01R 13/66* (2006.01)

(52) U.S. Cl.
CPC ....... *H01R 31/065* (2013.01); *H01R 13/6675* (2013.01)

(58) Field of Classification Search
USPC .......................... 439/170–173, 577; 320/111
See application file for complete search history.

(56) References Cited

U.S. PATENT DOCUMENTS 2,196,786 A * 4/1940 Wahl .................. B26B 19/3806 174/54
2,392,445 A * 1/1946 Anderson .............. G04B 47/02 174/54
3,141,937 A * 7/1964 Edward, Jr. .......... H01H 35/003 200/61.58 R
3,348,116 A * 10/1967 Freeman ................. B26B 7/005 320/115
4,409,536 A * 10/1983 Evjen ................. H01R 13/6271 174/54
4,467,263 A * 8/1984 Conforti ................. F21L 4/085 320/111
4,536,694 A * 8/1985 McCarty ............... H02J 7/0042 174/54
4,558,270 A * 12/1985 Liautaud ............... H02J 7/0045 320/110
4,629,962 A * 12/1986 Arakawa ............. H01M 2/1022 320/113
4,773,032 A * 9/1988 Uehara ................... G06F 1/183 439/131
5,075,615 A * 12/1991 Dantis .................... H01R 31/02 320/111

(Continued)

*Primary Examiner* — Neil Abrams

(57) ABSTRACT

The present invention, relates to an improved mobile cell-phone charger device, a wireless USB male prong plug, to charge a plurality cell-phones or tablets apparatus members. One of the embodiment features of the present invention, pertains to a revolving pivot pinion wheel, which rotates in a clockwise or counterclockwise movement, inside the casting frame member, charging a cell-phone member. This improved mobile cell-phone charger device, consist of an electrical female prong connector holes, attached to a revolving pivot pinion wheel, to charge multiples different cell-phones apparatuses members. The universal multi-charger device, has others improved features, such as a rotating dial member, to control and charge different cell-phones apparatuses members.

6 Claims, 1 Drawing Sheet

(56) References Cited

U.S. PATENT DOCUMENTS

| | | | | | |
|---|---|---|---|---|---|
| 5,138,351 | A * | 8/1992 | Wiegand | G03B 7/26 | 320/111 |
| 5,187,422 | A * | 2/1993 | Izenbaard | H02J 7/0006 | 320/110 |
| 5,432,689 | A * | 7/1995 | Sharrah | F21L 4/085 | 362/183 |
| 5,539,821 | A * | 7/1996 | Blonder | H02J 7/0044 | 379/446 |
| 5,549,486 | A * | 8/1996 | Cavallaro | B60R 11/0241 | 439/500 |
| 5,587,645 | A * | 12/1996 | Sciammarella | H02J 7/0044 | 250/215 |
| 6,123,299 | A * | 9/2000 | Zach, Sr. | A45D 1/00 | 248/117.1 |
| 6,371,815 | B1 * | 4/2002 | Wetzel | H01R 27/00 | 320/115 |
| 6,377,022 | B1 * | 4/2002 | Rhoads | A47J 42/26 | 320/114 |
| 6,438,229 | B1 * | 8/2002 | Overy | H02J 7/0044 | 379/446 |
| 6,518,724 | B2 * | 2/2003 | Janik | G06F 1/1632 | 320/115 |
| 6,913,477 | B2 * | 7/2005 | Dayan | H01R 13/22 | 439/188 |
| 6,938,867 | B2 * | 9/2005 | Dirks | H01R 13/72 | 248/309.1 |
| 7,013,164 | B2 * | 3/2006 | Lin | H04B 1/207 | 455/42 |
| 7,086,907 | B2 * | 8/2006 | Bhavnani | H01R 24/68 | 320/107 |
| 7,183,743 | B2 * | 2/2007 | Geiger | B60R 11/02 | 320/111 |
| 7,201,611 | B2 * | 4/2007 | Faranda | G06F 1/1632 | 439/540.1 |
| 7,266,391 | B2 * | 9/2007 | Warren | G06F 1/1616 | 343/702 |
| 7,422,476 | B2 * | 9/2008 | Marmaropoulos | A45C 15/00 | 185/15 |
| 7,654,855 | B2 * | 2/2010 | Liao | H01R 13/60 | 439/441 |
| 7,682,185 | B2 * | 3/2010 | Liao | H02J 7/0044 | 439/501 |
| 7,868,589 | B2 * | 1/2011 | McSweyn | H02J 7/0044 | 320/107 |
| 8,415,920 | B2 * | 4/2013 | Liao | H02J 7/0042 | 16/225 |
| 8,535,102 | B1 * | 9/2013 | Colahan | H01R 31/06 | 439/5 |
| 8,564,243 | B2 * | 10/2013 | Chen | H02J 7/0054 | 320/108 |
| 8,686,683 | B2 * | 4/2014 | Caskey | H01R 13/6675 | 320/107 |
| 8,801,441 | B2 * | 8/2014 | Zhang | H02J 7/0044 | 439/131 |
| 8,864,517 | B2 * | 10/2014 | Cohen | H01R 13/73 | 439/536 |
| 8,961,220 | B2 * | 2/2015 | Hilbourne | H01R 13/516 | 439/502 |
| 9,093,848 | B2 * | 7/2015 | Miller | H02J 7/0027 | |
| 9,161,464 | B2 * | 10/2015 | Liao | H05K 5/0065 | |
| 9,236,687 | B2 * | 1/2016 | Aldereguia | H01R 13/633 | |
| 9,318,915 | B2 * | 4/2016 | Miller | H02J 7/025 | |
| 9,385,549 | B2 * | 7/2016 | Miller | H02J 7/0042 | |
| 9,413,179 | B2 * | 8/2016 | Sorias | H02J 7/0044 | |
| 9,455,543 | B2 * | 9/2016 | Liao | H01R 31/065 | |
| 9,551,454 | B2 * | 1/2017 | Lipke | H02G 3/14 | |
| 9,620,911 | B2 * | 4/2017 | Warren | H01R 13/6675 | |
| 9,627,802 | B2 * | 4/2017 | Warren | H01R 13/60 | |
| 9,853,384 | B2 * | 12/2017 | Azoulay | H01R 13/717 | |
| 9,997,882 | B1 * | 6/2018 | Warren | H01R 31/065 | |
| 10,027,149 | B2 * | 7/2018 | Warren | H01R 31/065 | |
| 10,074,999 | B2 * | 9/2018 | Watson | H02J 7/0027 | |
| 2004/0085043 | A1 * | 5/2004 | Germagian | H02J 7/0042 | 320/107 |
| 2008/0157715 | A1 * | 7/2008 | Rosenboom | H02J 7/0044 | 320/108 |
| 2009/0309542 | A1 * | 12/2009 | Hung | H01R 31/065 | 320/111 |
| 2010/0202137 | A1 * | 8/2010 | Dalton | F21L 4/085 | 362/183 |
| 2016/0218536 | A1 * | 7/2016 | Caren | H02J 7/0045 | |
| 2016/0380457 | A1 * | 12/2016 | Criss | H02J 7/0045 | 320/107 |
| 2018/0269640 | A1 * | 9/2018 | Walker | H01R 31/065 | |

* cited by examiner

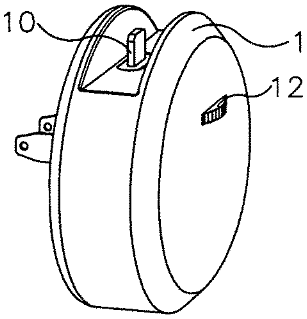
FIG. 1
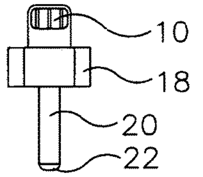
FIG. 1B
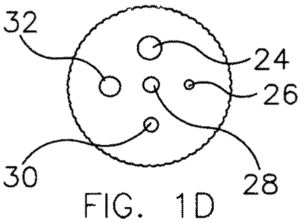
FIG. 1D
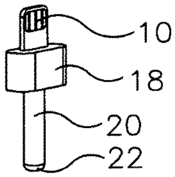
FIG. 1A
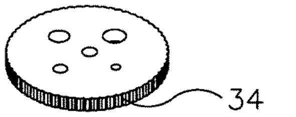
FIG. 1C
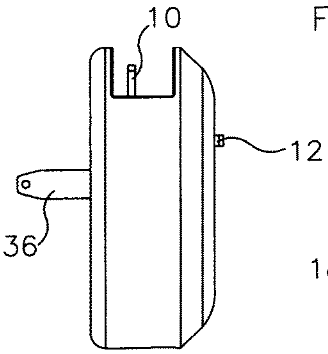
FIG. 2
FIG. 6
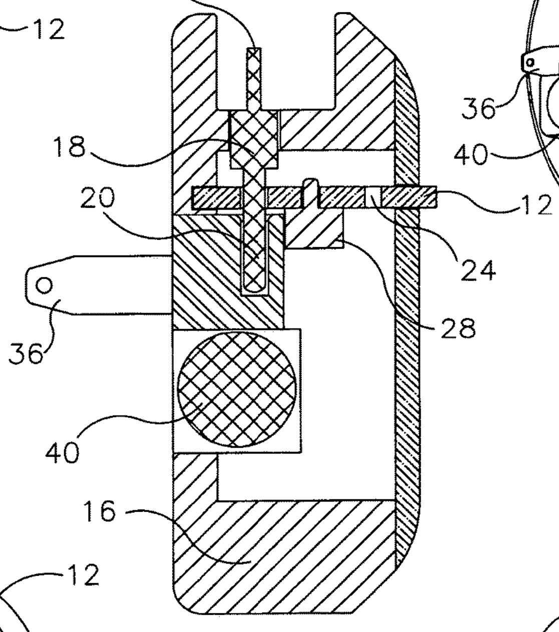
SECTION A–A
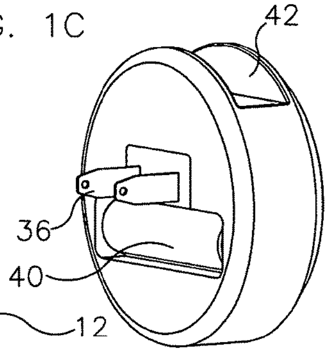
FIG. 3
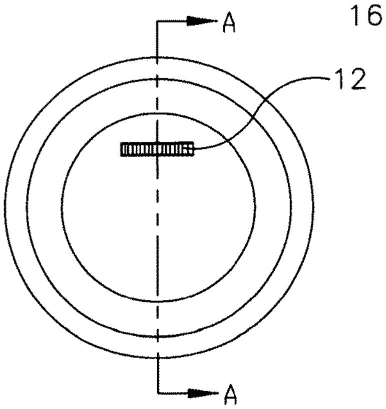
FIG. 4
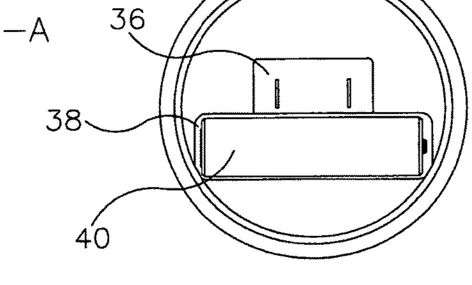
FIG. 5

UNIVERSAL MULTI-CHARGER DEVICE

BACKGROUND

The present invention relates to a device for charging battery-operated mobile devices.

BRIEF DESCRIPTION OF THE DRAWINGS

FIG. 1 shows a perspective view of a universal multi-charger

FIG. 2 shows a side view of a universal multi-charger

FIG. 3 shows a back side of a universal multi-charger

FIG. 4 which includes SECTION A-A shows a front view and section view of a universal multi-charger FIG. 5 shows a back view of a universal multi-charger AC and DC power source.

| | | | |
|---|---|---|---|
| 10 | USB pin head terminal plug | 12 | electrical circular rotating pivot pinion wheel |
| 16 | housing frame member | 18 | AC and DC power converter power supply |
| 20 | USB elongated metal arm | 22 | metal prong taper end |
| 24 | electrical female conductor hole (1) | 26 | electrical female conductor (2) |
| 28 | spindle hole | 30 | electrical female conductor hole (3) |
| 32 | electrical female conductor hole (4) | 34 | grooved electrical circular rotating pivot pinion wheel |
| 36 | AC wall-plug | 38 | battery terminal ends |
| 40 | DC battery power | 42 | slot holder member |

DETAIL DESCRIPTION OF THE PREFERRED-EMBODIMENT

One of the preferred embodiment of the present invention, a universal multi-charger device, is constructed with a durable plastic body material, with a housing frame member 16; having an USB pin head terminal plug member 10, with an extended USB pin head terminal plug member, from a slot holder member 42, to connect to a cellular mobile terminal side member. The USB pin head terminal plug member 10, serves as a plugin connector plug, which plugs into a cellular mobile terminal side member, to charge a plurality cellular mobile, or tablet device members. As shown in the configuration drawing, in FIG. 1, shows a USB pin head terminal plug member 10, at the top of the slot holder member 42, used for charging a plurality cellular mobile device members. In the configuration drawing in FIG. 1, shows an electrical circular rotating pivot pinion wheel member 12, which resides inside the housing frame member 16; to rotate in a clockwise, or counterclockwise movement, to charge a plurality cellular mobile device. Also in the drawing configuration 1A, shows a USB pin head wireless terminal plug member 10, is constructed with an AC and DC converter power supply member 18, that's connected to an elongated metal arm member 20; having a metal prong end member 22, used for a plugin connection, to an electrical circular rotating pivot pinion wheel member 12, to charge a plurality cellular mobile device.

In the configuration drawing in FIG. 1A-1B, shows a USB wireless pin head elongated male port prong, a terminal plug member 10, attached to a body member 18, connected to a metal prong connector plug member 20, with a metal prong end member 22, to charge a cellular mobile device member. This USB wireless pin head terminal plug member 10, serves as a plugin connector plug, which plugs into a cellular mobile terminal side member, to charge a cellular mobile devices. The USB wireless terminal plug member 18, serves as an AC/DC converter power supply member, which converts AC current voltage, to a DC battery power source. The metal prong member 20, with a metal prong end member 22, is used for a plugin connection, into an electrical female conductor holes, attached to the electrical circular rotating pivot pinion wheel member 12.

As shown in the drawing in FIG. 1C-1D, shows an electrical circular rotating pivot pinion wheel member 12, with an outer grooved surface area member 34, is structure inside the housing frame member 16, to rotate in a clockwise, or counterclockwise movement. In FIG. 1D, shows a different plurality metal electrical conductor holes members 24, 26, 30, and 32, to conduct an electrical current charge, to a cellular mobile device members. The spindle member 28, is located in the center of the electrical circular rotating pivot pinion wheel member 12, provides a rotation movement, of the electrical circular rotating pivot pinion wheel member 12.

In the configuration drawing in FIG. 2, shows a side pictorial view of the universal multi-charger device housing frame 16, with an extended wireless pin head terminal plug 10, located at the top of the slot holder member 42; and on the back of the housing frame member 16, shows an AC wall-plug member 36, which uses 120 volts AC current voltage, to charge a cellular mobile device member. Also in FIG. 2, shows an electrical circular rotating pivot pinion wheel member 12, resides inside the housing frame member 16, used for rotation.

As shown in the configuration drawing in FIG. 3, shows a top pictorial view of the slot holder member 42, attached to the housing frame 16, used for holding a cellular mobile device member, in a horizontal, or vertical position. Also in FIG. 3, shows a 120 volts AC wall-plug member 36, with DC battery power source member 40. In the configuration drawing in FIG. 4, shows a front view of the electrical circular rotating pivot pinion wheel member 12, resides inside the housing frame member 16. In the drawing in FIG. 5, show a back pictorial view of the universal multi-charger device member 16, showing an AC wall-plug member 36, a DC battery power source member 40; having a positive cathode and negative anode, located inside the housing frame 16.

In the configuration drawing in FIG. 6, section A-A, shows a housing frame member 16, having an USB wireless pin head member 10, extended from the slot holder member 42, with a structure body member 18, attached to an elongated metal prong member 20, connected to an electrical circular rotating pivot pinion wheel member 12, resides inside the housing frame member 16. As shown in the FIG. 6, shows an USB wireless elongated metal male prong plug member 20, a metal prong member 20, is used for plugging a metal prong member 20, into an electrical circular rotating pivot pinion wheel member 12, to charge a cellular mobile device member. In FIG. 6, shows an electrical circular rotating pivot pinion wheel member 12, structure with a spindle member 28, located in the center of the pinion wheel member 12, to rotate it in a clockwise, or counterclockwise movement. As shown in the FIG. 6, shows an electrical circular rotating pivot pinion wheel member 24, shows an electrical female conductor holes member 24, attached to an electrical circular rotating pivot pinion wheel member 12, to charge a plurality cellular mobile device. Also in the FIG. 6, shows an AC wall-plug member 36, connected to the back of the housing frame 16, shows the charger device uses 120 volts AC current voltage and DC battery power source member 40, to charge a mobile device. This universal multi-charger device, is improved charger device, which converts AC current power to DC battery power source.

What is claims:

1. A universal multi-charger apparatus, comprising:

a plurality said USB wireless elongated port prong plug, a plugin connector plug, a said plurality metal prong plugin connector plug, that's connected to a said female electrical conductor holes, attached to a said electrical circular rotating pivot pinion wheel member, to charge a said plurality cellular mobile phone member; and (b) a plurality said USB wireless elongated port prong plug, having a said metal prong plugin connector plug, that's connected to a said female electrical conductor holes member, attached to a said electrical circular rotating pivot pinion wheel member, thereby rotating in a clockwise, or counterclockwise movement, inside a said housing frame member; and (c) a universal multi-charger apparatus a said slot holder member, having an said USB wireless elongated port prong plug, holds a said cellular mobile member, in a charging position, in a said slot holder member, attached with a said elongated metal prong plugin connector plug, connected to a said electrical circular rotating pivot pinion wheel member; and (d) a universal multi-charger apparatus, having a said electrical circular rotating pivot pinion wheel member, attached with a said female electrical conductor holes, used for charging a said plurality cellular mobile phone apparatus members; and (e) a universal multi-charger a said cordless apparatus member, having a said USB wireless elongated metal prong plug, a said plugin connector plug, thereby plugging into a said metal prong end member, into a said electrical female conductor holes, to charge a said cellular mobile phone apparatus member.

2. The plurality said USB wireless pin head elongated male port prong plug, as set forth in claim 1, wherein said USB wireless pin head elongated male metal prong plugin connector plug, used for plugging a said prong end member, into an said female electrical conductor holes, attached to an said electrical circular rotating pivot pinion wheel member, thereby charging a said plurality cellular mobile phone apparatus member.

3. The plurality said USB wireless pin head elongated male port prong plug, as set forth in claim 2, wherein said USB wireless pin head elongated male metal prong plugin connector plug, having a said different sizes metal prong ends members, connected to a said different sizes electrical conductor holes, attached to an said electrical circular rotating pivot pinion wheel member, to charge a said plurality cellular mobile phone apparatus members.

4. The plurality said USB wireless pin head elongated male port prong plug, as set forth in claim 3, wherein a said male metal prong end member, used for charging a said different plurality cellular mobile phone apparatus members.

5. The universal multi-charger apparatus said holder member, as set forth in claim 4, wherein a said slot holder member holds a said cellular mobile phone apparatus member, in a horizontal, or vertical charging position, having a said USB wireless pin head elongated male port prong plug, a said plugin connector plug, that's plugs into a said electrical circular rotating pivot pinion wheel member.

6. The universal multi-charger a said cordless apparatus member, as set forth in claim 5, wherein a said cordless charger apparatus member, such that a said USB wireless pin head elongated male metal prong plugin connector plug, whereby having an said electrical converter AC and DC power supply, that convert ac current, to dc battery power, to charge a said plurality cellular mobile apparatus member.

* * * * *